Figure 1:
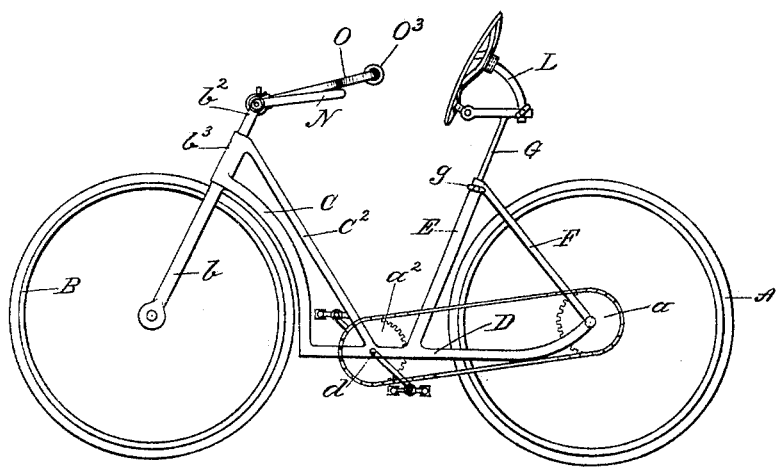

(No Model.) 2 Sheets—Sheet 1.

J. M. GILBERT.
BICYCLE.

No. 594,991. Patented Dec. 7, 1897.

WITNESSES:

INVENTOR
Joel M Gilbert
BY Edgar Tate & Co
ATTORNEYS.

(No Model.) 2 Sheets—Sheet 2.
J. M. GILBERT.
BICYCLE.
No. 594,991. Patented Dec. 7, 1897.
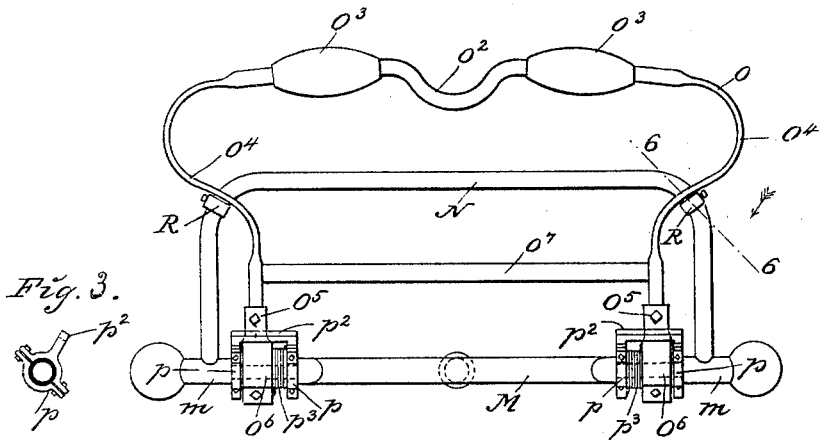
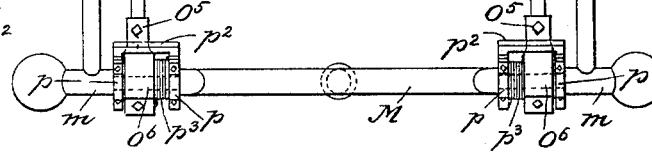
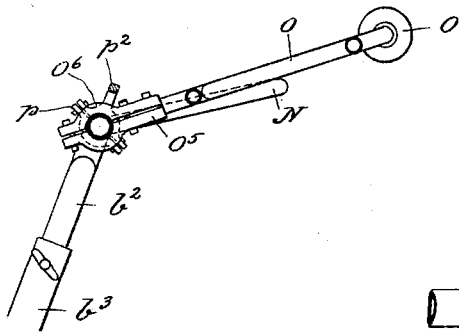
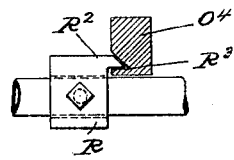
WITNESSES:
C. Nordford
C. Gerst
INVENTOR
Joel M. Gilbert
BY
Edgar Tate & Co
ATTORNEYS

UNITED STATES PATENT OFFICE.

JOEL MIX GILBERT, OF CLINTON, CONNECTICUT.

BICYCLE.

SPECIFICATION forming part of Letters Patent No. 594,991, dated December 7, 1897.

Application filed February 24, 1896. Serial No. 580,482. (No model.)

*To all whom it may concern:*

Be it known that I, JOEL MIX GILBERT, a citizen of the United States, and a resident of Clinton, in the county of Summit and State of Connecticut, have invented certain new and useful Improvements in Bicycles, of which the following is a specification, reference being had to the accompanying drawings, forming a part thereof, in which similar letters of reference indicate corresponding parts.

This invention relates to bicycles and similar vehicles, and the object thereof is to provide an improved mechanism for this class of vehicles which will project upwardly in front of the rider to enable the vehicle to be steered or guided while the rider maintains an upright position, and also to provide a guiding mechanism which is adapted to swing upwardly out of the way of the rider when mounting or dismounting; and with these and other objects in view the invention consists in the construction, combination, and arrangement of parts hereinafter more fully described in the specification and illustrated in the accompanying drawings, in which—

Figure 1 is a side view of a bicycle provided with my improvement. Fig. 2 is a plan view of the guiding or steering mechanism. Fig. 3 is a side view of a detail of the steering or guide mechanism construction. Fig. 4 is a side view of the construction shown in Fig. 2. Fig. 5 is a section on line 6 6 of Fig. 2.

Similar characters of reference designate like parts throughout the several views.

In the drawings forming part of this specification, A represents the drive-wheel, and B the guide-wheel, of an ordinary bicycle, and in the practice of my invention I provide a frame which consists of the forward yoke $b$, in which the guide-wheel is mounted and which is provided at its upper end with a rod $b^2$, with which the guiding or steering mechanism is connected, and a rigid frame connected therewith by means of a tubular head $b^3$, in which the rod $b^2$ is free to revolve, said rigid frame consisting of two rods C and $C^2$, which extend from the tubular head $b^3$ downwardly and backwardly and connected with a fork D, in which the pedal-shaft $d$ is mounted and in the rear end of which the drive-wheel A is mounted, and extending upwardly and backwardly from the separate sides of the fork D are two tubular rods E, each of which is provided at its upper end with a rod F, which extends downwardly and also connects with the rear end of the fork D.

The drive-wheel A is provided with the usual sprocket-wheel $a$, and a similar sprocket-wheel $a^2$ is mounted on the pedal-shaft.

My improved steering or guiding mechanism consists of a horizontal bar M, which is rigidly secured to the upper end of the rod $b^2$ and the ends of which are bent upwardly and outwardly to form extensions $m$.

Rigidly connected with each of the extensions $m$ of the bar M is a yoke N, the ends of the sides of which are connected with the extensions $m$, and this yoke N is adapted to serve as a support for the handle-bar, which comprises a spring-yoke O, which consists of a cross-bar $O^2$, on which the handles $O^3$ are secured, and side spring-arms $O^4$, which are preferably of the form of an ogee curve, the ends thereof being curved inwardly across the yoke N and being inserted in the sockets $O^5$, which are secured to or formed on the clamps or bands $O^6$, which are mounted on the extensions $m$ of the bar M, each of which is inclosed by two jaws P, which are united by a cross bar or head $P^2$, beneath which the sockets $O^5$ are passed and mounted on the extensions $m$ of the bar M between one of said jaws and the clamps or bands $O^6$, and on each end of said bar is a spring $P^3$, one end of which is secured to one of said jaws and the other to the inner side of said clamps or to the sockets $O^5$, which are formed thereon or secured thereto, and the ends of the spring-arms $O^4$ are preferably connected by a cross-bar $O^7$, and, if preferred, this cross-bar $O^7$ may be used to connect the sockets $O^5$.

Mounted on the yoke-support N at the points where the spring-arms $O^4$ of the handle-bar cross the same are adjustable rings or bands R, each of which is provided with a lug, projection, or catch $R^2$, which is adapted to enter a corresponding notch or recess $R^3$, formed in the spring-arms $O^4$, this feature of the construction being best shown in Figs. 2 and 5, and in operation, when it is desirable or necessary, the connection between the spring-arms $O^4$ and the fastening devices R may be broken by simply pulling backward on the handle-bar, and when this connection is broken the handle-bar will be raised by the springs P³ until the sockets or projections O⁵ strike upon cross-heads P², by which the jaws P are united.

The central portion of the handle-bar is preferably outwardly curved or yoke-shaped, as shown in Fig. 3, and the handles O³ may be constructed in any desired manner and composed of any desired material.

The operation will be readily understood from the foregoing description when taken in connection with the accompanying drawing and the following statement thereof.

In operation the vehicle is mounted in the usual manner, and when desired it may be operated in the usual manner, it being understood that the handle-bar is used for guiding the machine, as usual in this class of devices. It will also be understood that the position of the handle-bar is such as to facilitate this operation, and if at any time it becomes necessary to quickly dismount or such act is desirable, by giving a quick pull on the handle-bar the connection thereof with the fastening devices R may be broken and the handle-bar raised to its highest position by the spring P³, when the rider may dismount as quickly and easily as with ordinary machines of this class, and the form and construction of the handle-bar and the guiding mechanism connected therewith are such as to facilitate the operation of the machine or vehicle, as herein described, and to assist in supporting the body of the operator in an upright position, the arrangement of the handles being such as to aid in the movement of the feet, as will be readily understood.

It will thus be seen that I accomplish the object of my invention by means of devices which are simple in construction and operation and which will not materially add to the cost of the bicycle.

It will also be apparent that these improvements may be applied to tricycles and other vehicles of this class, and it is evident that changes in and modifications of the construction herein described may be made without departing from the spirit of my invention or sacrificing its advantages, and I reserve the right to make all such alterations therein and modifications thereof as fairly come within the scope of the invention.

Having fully described my invention, I claim as new and desire to secure by Letters Patent—

1. The combination with the frame of a bicycle or similar vehicle, of a guiding mechanism, which consists of a cross-bar rigidly secured to a vertical rod which is adjustably connected with the forward fork of the machine, said cross-bar being provided with a backwardly-directed yoke which is adapted to support a handle-bar which is provided with curved spring-arms which are connected with the ends of the cross-bar, and which rest upon the backwardly-directed yoke, substantially as shown and described.

2. The combination with the frame of a bicycle or similar vehicle, of a guiding mechanism which consists of a cross-bar rigidly secured to a vertical rod which is adjustably connected with the forward fork of the machine, said cross-bar being provided with a backwardly-directed yoke which is adapted to support a handle-bar which is provided with curved spring-arms which are connected with the ends of the cross-bar, and which rest upon said backwardly-directed yoke, the arms of said handle-bar being connected with clamps or bands which are mounted on the ends of the cross-bar, and the ends of said cross-bar being also provided with jaws between which said clamps or bands are mounted, said jaws being connected by cross-heads which limit the movement of the handle-bar, substantially as shown and described.

3. The combination with the frame of a bicycle or similar vehicle, of a guiding mechanism which consists of a cross-bar rigidly secured to a vertical rod which is adjustably connected with the forward fork of the machine, said cross-bar being provided with a backwardly-directed yoke which is adapted to support a handle-bar which is provided with curved spring-arms, which are connected with the ends of the cross-bar, and which rest upon said backwardly-directed yoke, the arms of said handle-bar being connected with clamps or bands which are mounted on the ends of the cross-bar, and the ends of said cross-bar being also provided with jaws between which said clamps or bands are mounted, said jaws being connected by cross-heads which limit the movement of the handle-bar, and each of said clamps or bands being provided with springs one end of which is secured thereto, and the other rigidly connected with one of said jaws, or with the cross-bar, substantially as shown and described.

4. The combination with a bicycle or similar vehicle, of a steering or guiding mechanism consisting of a cross-bar rigidly secured to the forward vertically-adjustable rod, of the frame, said cross-bar being provided with a backwardly-directed yoke, and a handle-bar which is adapted to rest thereon, said handle-bar being provided with spring-arms which extend across said yoke and which are connected with said yoke being provided with rings or clamps which are provided with projections or locking devices which are adapted to engage with said spring-arms and from which said spring-arms are adapted to be disconnected, as and for the purpose set forth, and substantially as shown and described.

In testimony that I claim the foregoing as my invention I have signed my name, in presence of the subscribing witnesses, this 20th day of February, 1896.

JOEL MIX GILBERT.

Witnesses:
C. GERST,
F. V. KIRCHHOFF.